May 3, 1966 K. G. PAAR 3,249,686
WIRE NETTING FOR USE AS ELECTRIC CONDUCTOR
Filed Sept. 12, 1962 2 Sheets-Sheet 1
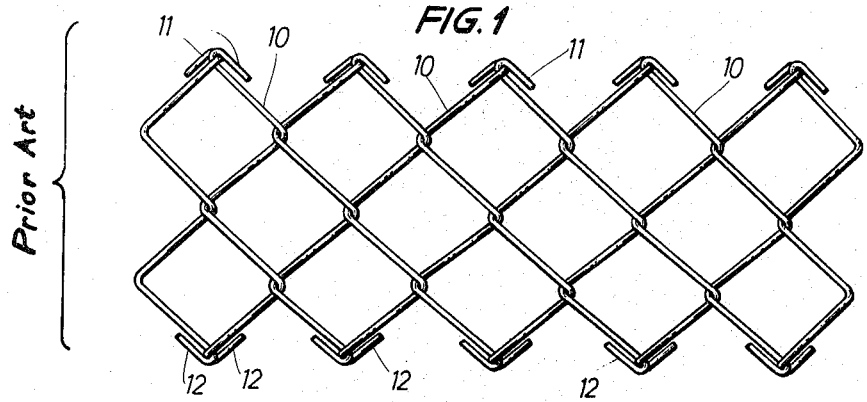
FIG. 1
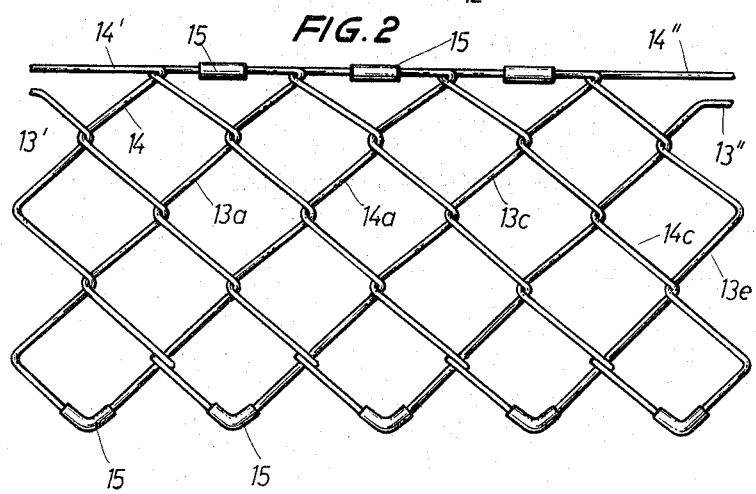
FIG. 2
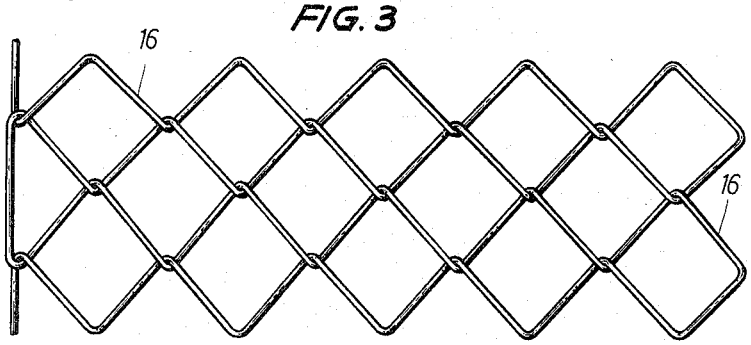
FIG. 3
INVENTOR
Kurt Günther Paar
BY 

May 3, 1966 K. G. PAAR 3,249,686
WIRE NETTING FOR USE AS ELECTRIC CONDUCTOR
Filed Sept. 12, 1962 2 Sheets-Sheet 2

INVENTOR.
Kurt Günther Paar
BY

United States Patent Office 3,249,686
Patented May 3, 1966

3,249,686
WIRE NETTING FOR USE AS ELECTRIC CONDUCTOR
Kurt Günther Paar, Garmisch-Partenkirchen, Germany, assignor to Eduard Hobrecker G.m.b.H., Hamm, Westphalia, Germany
Filed Sept. 12, 1962, Ser. No. 223,598
1 Claim. (Cl. 174—117)

The present invention relates to wire netting for use as electric conductor. Heretofore known wire netting, depending on the width and the mesh, consists of a number of bars or synthetic material coated individual wires. Wire netting of bare individual wires is unsuitable as electric conductor because the individual wires contact each other at each mesh and thus, if used as conductors, would cause short-circuits. Also, wire netting in which the individual wires have a coat of synthetic material as anticorrosion protection, and in which the free ends of the wires are merely bent over and suspended on each other, will not yield uninterrupted electric conductors so that this type of wire netting can be used and is being used only for ordinary fencing.

In connection with the electric safeguarding of areas such as walls, ceilings and floors in bank safes and for other rooms and chambers, it is known to rig electric insulated cables in a zigzag manner or to place a cage of parallel pipes through which wires extend for a closed circuit current, in plastic or in concrete. This known type of area safeguarding, however, has the drawback that by means of corresponding tools, the said cables or pipes can be exposed without damaging the conductors for the signalling circuit and can be bent to both sides so that a burglar can pass through without the alarm circuit becoming effective. For this reason, fencing around buildings or areas of various types in which the protective wires would be exposed can generally not furnish a safe protection against the entry of burglars or the like.

Other area safeguards according to which fencing provided with infra-red ray barriers, electromagnetic fields or ultrasonic means have, as experience has shown, frequently produced false alarms in view of snow, rain, fog, acoustic or earth disturbances and also by changes in temperature. In addition thereto, safety devices of the above-mentioned type can also be circumvented by undermining or by climbing thereover, so that the above-mentioned safety devices, in spite of high expenses, are not fully satisfactory.

It is, therefore, an object of the present invention to provide wire netting which will overcome the above-mentioned drawbacks.

It is another object of this invention to provide wire netting which can be built into ceilings, walls, floors and the like and which can be safely and effectively used as current conductor.

These and other objects and advantages of the invention will appear more clearly from the following specification in connection with the accompanying drawing, in which:

FIGURE 1 illustrates heretofore known ordinary wire netting with synthetic insulating coating for fencing;

FIGURE 2 illustrates a wire netting according to the present invention;

FIGURE 3 represents a modified wire netting according to the invention;

Figure 4:
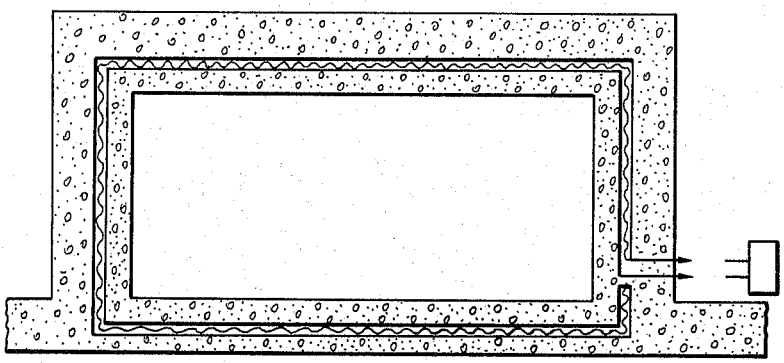
Figure 5:
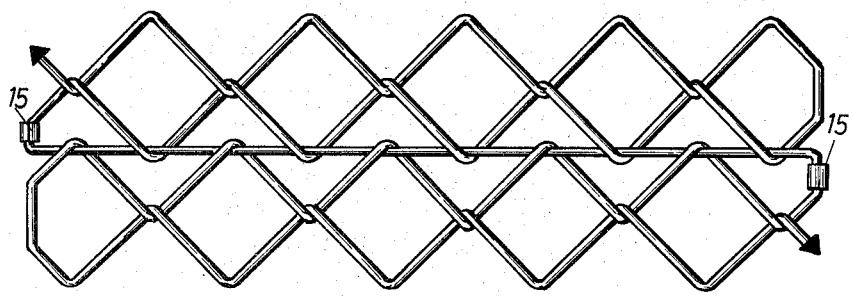
Figure 6:
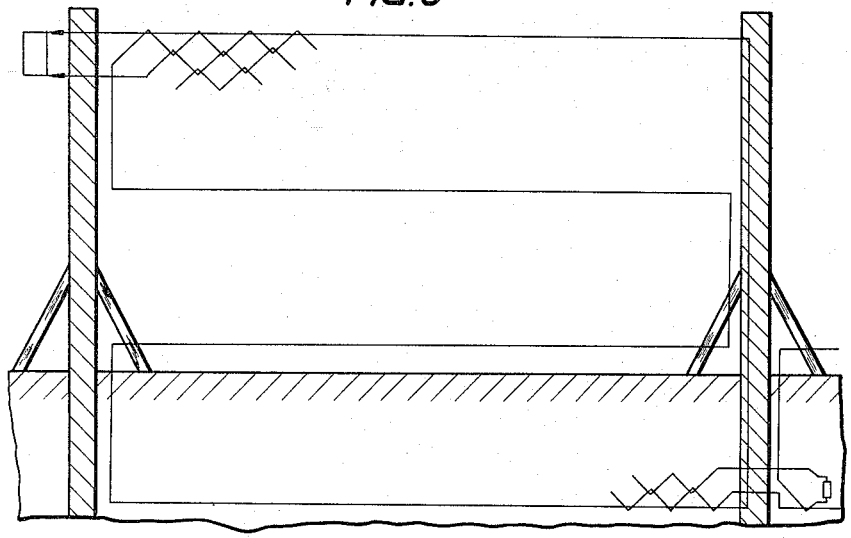

FIGURE 4 diagrammatically illustrates how a wire netting according to the present invention may be mounted in a ceiling;

FIGURE 5 illustrates an embodiment according to the invention showing the last row of meshes of a wire netting while a tensioning wire alternately passes through the meshes of two adjacent wire nettings, said tensioning wire being enclosed in an electric circuit; and FIGURE 6 represents a wire netting according to the invention used for prisons and the like in connection with the fences employed for such institutions, the source of electric current being shown as a rectangular box in the left-hand upper corner.

The wire netting according to the present invention which comprises individual wires or wire strands covered by or coated with a syntheic insulating material which may also be reinforced by heat-resistant material such as glass fibers, is characterized primarily in that the wires or wire strands form uninterrupted electric conductors which extend over the entire wire netting. The wires or strands themselves may be cadmium or zinc-coated iron wires or wires of stainless steel, copper, aluminum or heat-conducting steel wires. The insulation of these wires or strands prevents any short-circuits at the points of contact or crossing of said wires.

FIGURE 1 shows a wire fencing of the heretofore known type according to which the individual wires 10 consist of bare wires or wires with a coat of insulating material, with the start 11 and ends 12 of the wires bent over.

FIGURE 2 shows a first embodiment of a wire netting according to the present invention. As will be seen from FIG. 2, the wire netting illustrated therein is composed of a plurality of insulating wires 13, 13a, 13b, 13c, 13d, 13e and 14, 14a, 14b and 14c. In order to obtain uninterrupted conductors, the start and ends of the wires in FIG. 2 have been butt-seam welded, and the welding spots have been insulated by means of a shrink-hose 15 of thermoplastic material. If desired, the welded portions may be insulated by hardenable or tough elastic material. Instead of butt-seam welding, the starts and ends of the wires may, of course, also be placed parallel to each other and then welded or soldered. The starts 13' and 14' of the conductors of the thus created wire netting may be connected to any desired current supply source as, for instance, a battery or an electric motor, whereas the ends 13" and 14" may be interconnected by a resistance, an inductance, or by a capacitance.

When employing large wire netting, also uninterrupted individual wires or wire strands 16 may be employed in the manner illustrated in FIG. 3. The start and end of the wire 16 may then be connected to any desired current source with or without the interposition of resistors, capacitors or inductors.

For the safety wire netting according to the present invention, known braiding types may be employed which will make it impossible to widen or loosen the meshes without shearing or damaging the insulated wires or wire strands. Wire netting according to the invention may be employed for bank safe walls, ceilings, flooring and also for fencing and can easily be produced according to any desired height width and length. When employing heat-resistant, for instance, glass fiber reinforced insulation and heat conducting wires, it is possible by embedding such wire netting below the flooring or in the plaster of walls, to obtain an electric room or hot-bed heating in a very simple manner, whereas heretofore, the installation of heating wires was rather time-consuming and expensive.

If, in order to meet special requirements as to height, two or more standard widths have to be placed adjacent or above each other, such nettings are interconnected by insulated rigging wires which pass through and from mesh to mesh of the superimposed pieces of the wire nettings so as to make it impossible to widen the netting without interrupting or damaging the insulation. These insulated rigging wires or wire strands are arranged in series with the electric safety circuit so that also when said rigging wires are interrupted or damaged as to their insulation, the electric alarm will be initiated.

The wire nettings according to the invention are, when building bank safe walls, ceilings, flooring, or walls for prisons and the like, merely connected to the wooden planking or boarding and by pouring the concrete, are firmly connected thereto. There also exists the possibility of connecting such wire netting to existing ordinary walls or partitions such as wire-plaster walls and to embed said wire nettings by spray-plaster. For electric floor or room heating, the embedding of the wire netting may be effected in an analogous manner.

The insulated wire netting according to the invention may, when employed for safety fences of buildings or areas, be inserted in the ground to any desired depth in order to prevent undermining of the fence. If desired, the wire netting may also be inserted into the concrete in the ground. Climbing over the wire netting may be prevented by load fuses or by other electronic means with or without initiation of an alarm.

Inasmuch as with the wire netting according to the present invention, it is not possble to shear off or interrupt the individual wires or wire strands without damaging the insulation at the connectng points of the meshes and without initiating an alarm, it is possible, with the wire netting according to the present invention reliably electrically or electronically to prevent trespassing of sites or areas by unauthorized persons. This safety effect is obtained in a completely concealed manner inasmuch as the walls, ceilings, floors or fencing equipped with the wire netting according to the invention do not show any outside indication of safety devices or the like.

Snow, rain, fog or other climatic conditions or influences by shock waves on the ground, cannot cause any false alarms with wire nettings according to the invention. The wire netting according to the invention also makes it possible electrically or electronically to control the respective areas and area safety devices by night and by day without the necessity of having to switch off such safety devices during the daytime or businesstime.

It is, of course, to be understood that the present invention is, by no means, limited to the particular constructions shown in the drawings, but also comprises any modifications within the scope of the appended claims.

It should also be noted that the term "wire" as it appears in the claims also includes wire strands.

What I claim is:

A netting consisting entirely of wire and comprising: a first wire extending back and forth across the netting in one direction along a plurality of pairs of adjacent zig-zag paths with the wires of the respective paths of each pair of paths being interlocked with each other while the said pairs of paths are spaced from each other, a second wire also extending back and forth across the netting in the same direction along a plurality of pairs of adjacent zig-zag paths with the wires of each of the respective paths of each pair of paths being interlocked with each other while the said pairs of paths of the second wire are spaced from each other and disposed in the space between the pairs of paths of said first wire, the wires at the side edges of the pairs of paths of said first wire being interlocked with the wires at the side edges of the pairs of paths of the second wire thereby to form a continuous netting substantially inexpansible, each of said first and second wires being electrically continuous through the netting, and each of said first and second wires having a continuous coating of electrical insulation thereon.

References Cited by the Examiner

UNITED STATES PATENTS

| | | | |
|---|---|---|---|
| 112,705 | 3/1871 | Guernsey | 109—41 |
| 181,078 | 8/1876 | Larned | 340—276 |
| 362,010 | 4/1887 | Jewill | 174—117 X |
| 975,359 | 11/1910 | Hefter | 338—208 |
| 1,097,587 | 5/1914 | Hammond | 109—42 |
| 1,811,511 | 6/1931 | Mafera | 245—8 |
| 1,831,908 | 11/1931 | Harter | 245—8 |
| 1,885,361 | 11/1932 | Land | 245—8 |
| 1,962,041 | 6/1934 | Spong | 174—117 |

FOREIGN PATENTS 507,235   11/1954   Canada.

ROBERT K. SCHAEFER, *Acting Primary Examiner.*

JOHN P. WILDMAN, E. JAMES SAX,
 JOHN F. BURNS, *Examiners.*